Dec. 29, 1936.  C. F. FREDE  2,065,573
RAILWAY VEHICLE STRUCTURE
Filed Dec. 24, 1931
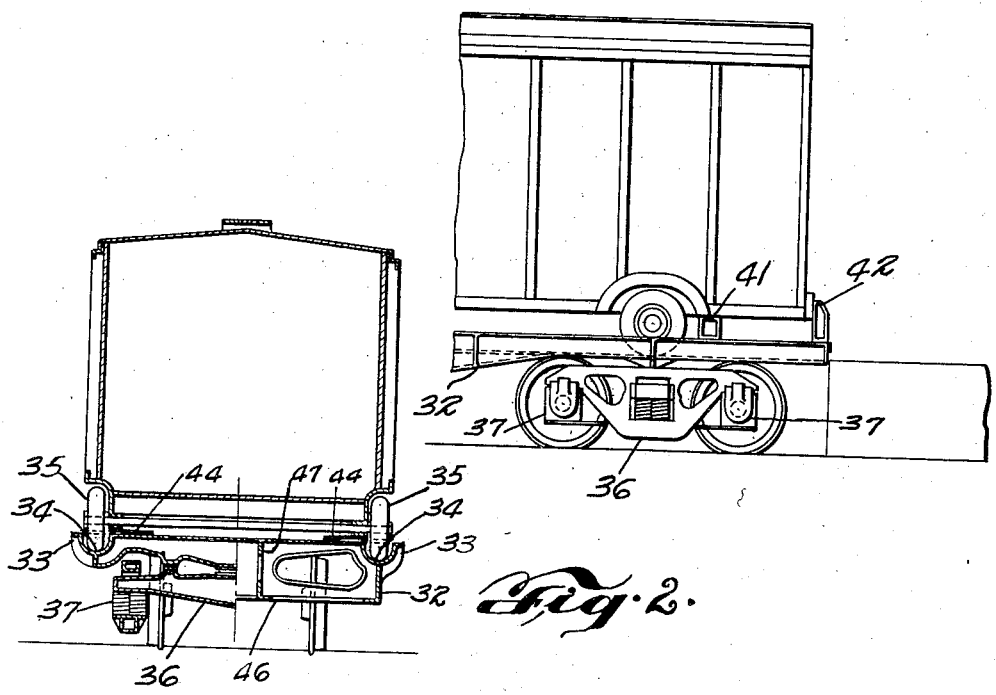
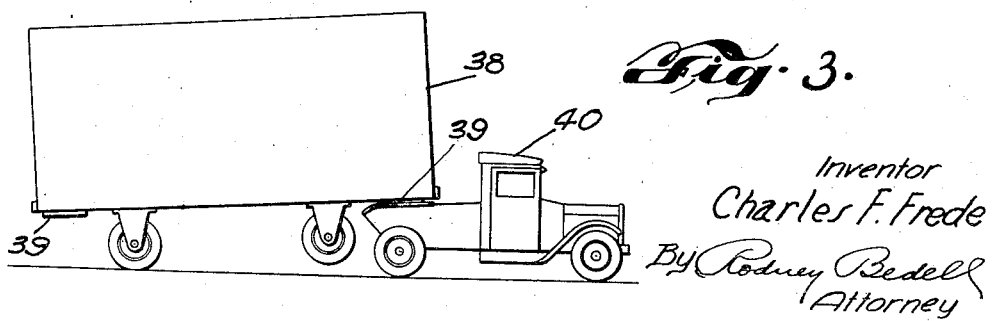
Inventor
Charles F. Frede
By Rodney Bedell
Attorney Patented Dec. 29, 1936

2,065,573

UNITED STATES PATENT OFFICE 2,065,573

RAILWAY VEHICLE STRUCTURE

Charles F. Frede, St. Louis, Mo., assignor to General Steel Castings Corporation, Granite City, Ill., a corporation of Delaware Application December 24, 1931, Serial No. 583,121

6 Claims. (Cl. 105—159)

This invention relates to railway rolling stock and particularly to freight cars having demountable lading containers.

It is a growing practice in freight shipment to utilize box-like containers which are packed by the consignor and unpacked by the consignee and are carried by trucks from the consignor to the railway car and from the railway car to the consignee. These containers must be handled by derricks or cranes or other additional mechanism. Also it is a common practice for wheeled vehicles to be run on their own wheels onto railway cars and transported by the latter over long distances. In some cases, such as in circus transportation, the vehicles are used primarily to carry lading between the railroad and points of delivery spaced from the railroad.

However, the idea of bodily transporting trucks and other road vehicles upon railroad cars has not been practically applied in general freight hauling, since the cars now in use are not adapted to provide stable mounting for such vehicles.

The main object of the present invention is to provide a railway car which is especially constructed to accommodate road vehicles and particularly trailers adapted to be pulled by a motor unit.

This object is attained substantially by providing a railway car underframe with suitable runways for the trailer wheels whereby the truck may be carried at a lower level than is possible on the ordinary car. Also with this arrangement the trailer truck is more securely carried on the car.

In the following drawing which illustrates the invention—

Figure 1 is a side view of one end of railway car and a highway trailer mounted thereon.

Figure 2 is a vertical transverse section through the structure shown in Figure 1, the left hand half of the section being taken through the truck bolster and the right hand half of the section being taken at a point intermediate the trucks.

Figure 3 illustrates the manner of handling the trailer on the highway.

In Figures 1 and 2, the car underframe includes side sills 32, transoms 46, and a main force transmitting center sill 47. The side sills have sideward projections 33 and, in its upper surface, each sill has an elongated recess or groove 34 for receiving the trailer wheels 35. The runways are spaced from the car truck wheels, permitting the use of a truck 36 having outside journals as is customary. Movable stops 41 and 42 are provided to hold the trailer body in position on the underframe. Removable cover plates 44 may be placed over grooves 34, when the car is used without the trailer compartments, to provide a wider flat platform as in the ordinary standard type of flat car.

Figure 3 shows the manner of transportation of the individual trailer compartments to and from the railway car by truck. Trailer body 38 is shown as having a swivel connection 39 at each end for cooperating with a corresponding element on the truck chassis 40.

Obviously, other types of trailer bodies than those illustrated may be used, and in fact my novel car underframe is adapted to readily mount truck trailers at present commonly used by trucking companies. The car underframe is shown as comprising an integral structure, but this type of construction is not essential and the underframe may be composed of various parts formed separately and assembled. Other variations of the selected embodiments may be made without departing from the spirit of the invention and the exclusive use of all such modifications as come within the scope of the appended claims is contemplated.

What is claimed is:

1. A railway vehicle underframe member including in an integral structure, a floor structure and a side sill member beneath the level of said structure, said floor structure having an elongated depression of substantial width immediately above said sill member and said depression forming a runway for lading supporting wheels, said sill member merging with and reinforcing said depression and said floor structure having horizontally alined portions on both sides of said depression.

2. An integral side sill structure for a railway vehicle underframe including a vertical web and a top web merging with the upper part thereof, there being an elongated depression in said top web forming a runway for lading supporting wheels and having portions at both sides of said depression forming floor structure.

3. In a railway vehicle underframe, side sills and transverse members rigidly tied together, said sills having upright parts and top members and said top members each having an elongated depression of substantial depth and width forming a runway for lading supporting wheels, said transverse members and said side sill upright parts merging with and reinforcing said depressions, said sill top members and the tops of said transverse members being horizontally aligned and forming floor structure.

4. The combination of elements specified in claim 1 including a movable cover adapted to close said depression and extend the useful portion of said floor web above said depression.

5. In a railway vehicle underframe, a side sill and floor structure, said side sill having transversely spaced top parts horizontally alined with said structure, and forming additional floor structure, there being a longitudinal depression between said sill top parts forming a runway for lading supporting wheels.

6. In a railway flat top vehicle, underframe side sills each having transversely spaced top members and a longitudinal recess between the same forming a runway for lading supporting wheels, transoms connecting said sills and having top members alined with said side sill top members, said top members forming floor structure, and movable flooring adapted to rest upon said sill top members along said runways whereby the vehicle may be provided with a continuous flat floor extending from between said sills to the outer edges thereof.

CHARLES F. FREDE.